United States Patent [19]

Stickle, deceased et al.

[11] 4,089,259

[45] May 16, 1978

[54] CORN FLOUR MILLING

[76] Inventors: Daniel T. Stickle, deceased, late of Dallas, Tex.; by Hortencia Martinez Stickle, executrix, 4332 Millcreek Rd., Dallas, Tex. 75234

[21] Appl. No.: 628,106

[22] Filed: Nov. 3, 1975

[51] Int. Cl.[2] .......................... A23P 1/00; B02B 5/00; B02C 4/06

[52] U.S. Cl. .................................. 99/355; 241/101.5; 241/68; 100/92

[58] Field of Search ................. 99/355, 467, 470, 483, 99/516, 517, 537, 447; 426/455–463, 464, 468, 473, 622; 34/127, 129, 132; 241/62, 101.2, 101.5, 68, 277; 100/92; 209/238, 138, 234

[56] References Cited

U.S. PATENT DOCUMENTS

| | | | |
|---|---|---|---|
| 1,189,124 | 6/1916 | Kellogg | 426/468 |
| 1,808,866 | 6/1931 | Soults | 99/447 |
| 2,101,417 | 12/1937 | Waldvogel | 99/355 |
| 2,282,708 | 5/1942 | Dantzig | 426/468 |
| 2,358,827 | 9/1944 | Rakowsky | 99/483 |
| 2,450,843 | 10/1948 | Sherman | 241/62 |
| 2,487,162 | 11/1949 | Meyer | 99/516 |
| 3,117,868 | 1/1964 | Madrazo | 426/622 |
| 3,133,818 | 5/1964 | Gould | 426/464 |
| 3,369,908 | 2/1968 | Gonzalez | 426/622 |
| 3,701,670 | 10/1972 | Pierce | 99/358 |

*Primary Examiner*—Harvey C. Hornsby
*Assistant Examiner*—Robert Pous
*Attorney, Agent, or Firm*—Christie, Parker & Hale

[57] ABSTRACT

Flour is made from whole cereal grains, such as, corn, wheat, rye, and barley by heating the whole grain kernels to between about 170° F. and 210° F. while maintaining the moisture content of the whole kernels between about 8% and about 16% by weight. The whole kernels are squeezed into flakes while maintaining their temperature above about 170° F., and the flakes are ground to form whole grain flour. The product has a surprisingly long shelf life, even though it contains all of the oil originally in the grain.

14 Claims, 2 Drawing Figures

Figures 1, 2:
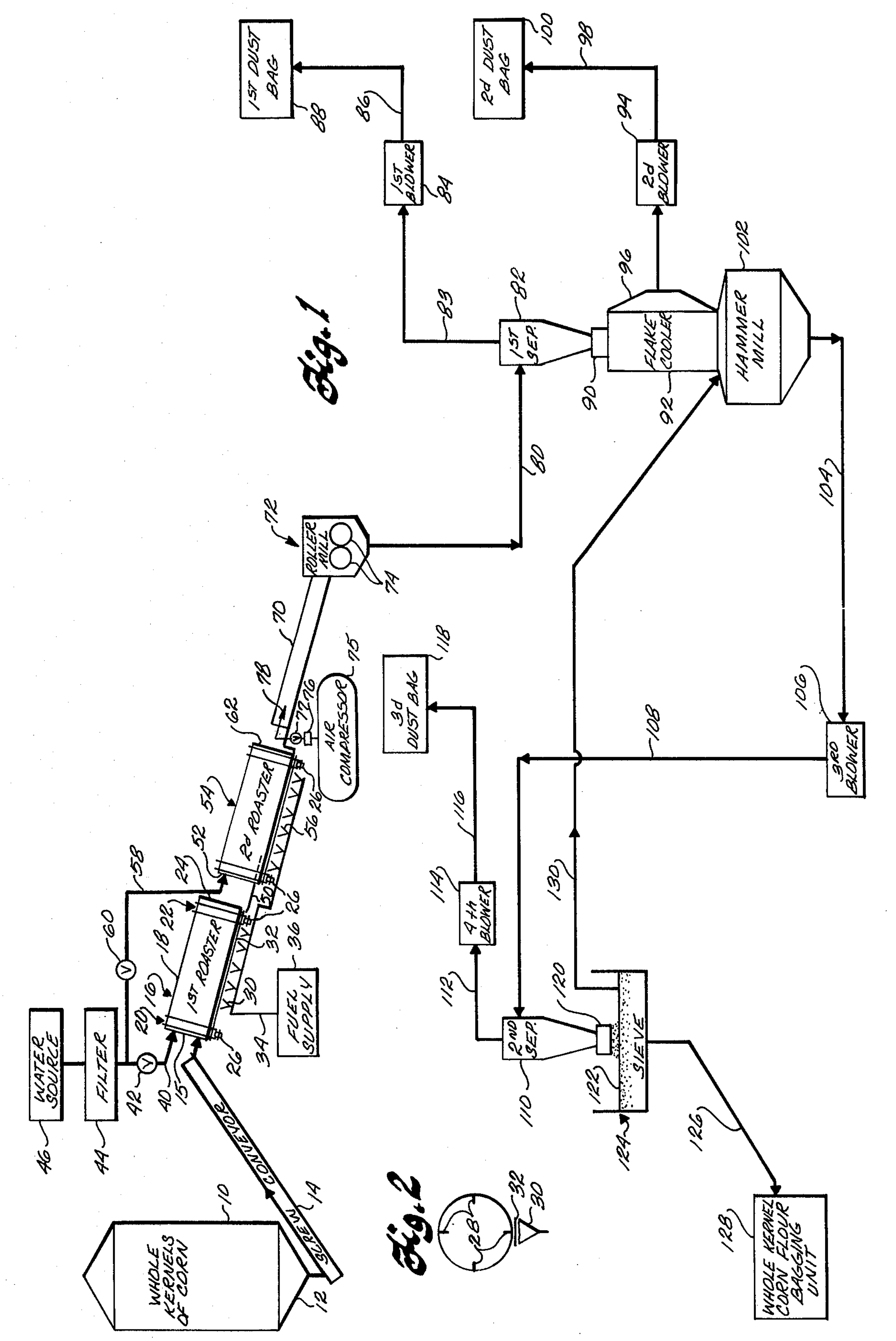

WHOLE KERNELS OF CORN
SCREW CONVEYOR
WATER SOURCE
FILTER
1ST ROASTER
2d ROASTER
FUEL SUPPLY
AIR COMPRESSOR
ROLLER MILL
1ST SEP.
1ST BLOWER
1ST DUST BAG
FLAKE COOLER
2d BLOWER
2d DUST BAG
HAMMER MILL
3RD BLOWER
3d DUST BAG
4th BLOWER
2ND SEP.
SIEVE
WHOLE KERNEL CORN FLOUR BAGGING UNIT
10
12
14
15
16
18
20
22
24
26
28
30
32
34
36
40
42
44
46
50
52
54
56
58
60
62
70
72
74
75
76
77
78
80
82
83
84
86
88
90
92
94
96
98
100
102
104
106
108
110
112
114
116
118
120
122
124
126
128
130

CORN FLOUR MILLING

FIELD OF THE INVENTION

This invention relates to improvements in apparatus and process for making flour from whole cereal grains, such as, corn, wheat, rye, barley, and the like. The invention is particularly suitable for making flour from whole corn kernals, and is described in detail with respect to that grain.

BACKGROUND

Kernals of shelled corn are milled into meal and flour by two general systems, namely, wet milling and dry milling.

Conventional wet milling methods are described in U.S. Pat. Nos. such as 2,584,893; 2,704,257; and 3,083,103. In these and other conventional wet processes, whole kernals of shelled corn are soaked and steeped in hot lime water until the kernals have been completely penetrated by the hot alkaline solution, resulting in the kernal becoming softened and the hulls partially digested. The lime treatment was required to soften and digest and hemi-cellulose content of the hulls and to peptize or disrupt the protein content of the corn kernal so that the kernals and hulls could be more readily ground.

Steeping corn kernals in hot lime water is a lengthy process ranging from a few hours to as much as 24 hours. Furthermore, the steeping is followed by washing away the lime water before grinding the corn. This results in extraction and wasting of the thiamin, riboflavin, and niacin content of the whole corn. Other alkaline-soluble nutrients and protenaceous materials are also lost by this process. This loss due to steeping and washing is not only wasteful from a nutritional standpoint, but also results in a loss of total yield, which of course is an economic loss. Moreover, where the product is to be dried to a flour for later reconstitution to a dough, an economic disadvantage is encountered because of the energy required to evaporate the water added to the product during the soaking and steeping operations.

Another disadvantage of the wet process is that the lime treatment imparts a characteristic flavor which is different from whole corn flavor and which is found objectionable by many consumers.

In dry milling, whole kernals of corn, not subjected to the lime water steeping just described, have been ground into cornmeal and corn flour since colonial times. Such meal and flour is preferred because it has a better flavor than the wet-processed product, and contains substantially all of the nutrition naturally present in whole kernals. However, it has storage stability problems. Mature corn kernals are composed of four major parts: the pericarp (hull or bran), germ (embryo), endosperm, and tip cap. The germ is very nutritious because it contains a large portion of the protein and about 85% of the total corn oil (lipids) in the kernal. When the raw whole kernals of corn are ground, the lipids released from the germ apparently come in contact with certain enzymes in the corn kernal, causing rapid onset of hydrolytic rancidity. Longer storage time adds oxidative rancidity, which is caused by air oxidation of unsaturated fatty acids in the corn oil. Although a small amount of fatty acids is part of the desirable corn flavor, an excess causes bitter flavors in the food, and can make it inedible.

Since whole cornmeal and flour contains all of the original oil, its shelf-life, when sold in packages, is considerably reduced. Attempts to lengthen the shelf-life of whole cornmeal or flour by the use of heat or antioxidants have so far been unsuccessful.

Consequently, most modern-day cornmeal or flour which is to be stored for even a short length of time is prepared from degerminated corn kernals, which are free of the hull and germ. The degermination process is not only time consuming and expensive, but it also removes from the corn an important part of the nutrition in the whole kernel.

U.S. Pat. No. 3,404,986 describes a process for preparing corn flour from cornmeal which is soaked in water before processing into flour. This product does not have a long shelf-life, and requires combining with flour made from degerminated cornmeal.

U.S. Pat. Nos. 3,694,220 and 3,701,670 describe a process for preparing feed from corn kernels heated by infrared radiation for a relatively short period of time, and then passed through a rolling mill to form flakes. This method is not satisfactory for preparing flour for human consumption because the final product contains hard "flinty" particles.

SUMMARY OF THE INVENTION

This invention provides method and apparatus for preparing from whole kernels of grain a flour which is stable and has a long shelf-life, and which contains no hard "flinty" particles.

In terms of method, the invention includes making flour from whole kernels of grain comprising the steps of heating the whole kernels to above about 170° F. and just below the temperature which would cause them to pop for at least 1 minute. The heated kernels are then squeezed into flakes, which are thereafter ground to form a whole corn flour.

In the preferred process, the whole kernels of grain are mixed with just enough water to wet their surfaces before tumbling in a hot gas. This prevents local overheating of the kernels, while at the same time avoiding any substantial increase in the amount of moisture in the interior of the kernels, which is preferably kept between about 8% and about 15% by weight to prevent overprocessing of the kernals due to the application of heat. Preferably, the kernals are heated by passing them through hot gas generated by the burning of natural gas or an equivalent fuel. Ordinarily, heating the whole kernels for one to five minutes is sufficient to produce the soft, malleable state required before being squeezed into flakes, which preferably have a thickness between 0.006–0.030 inches.

In terms of apparatus, the invention inclues an elongated cylindrical drum mounted to rotate about its longitudinal axis, which is slightly inclined to the horizontal. The drum has an inlet at its upper end and an outlet at the lower. Means are provided for introducing grain into the drum inlet at its upper end. Means are also provided for flowing hot gas through the drum. Further means are provided for rotating the drum to cause the grain in it to be tumbled through the hot gas and be moved to the drum outlet. A grain conduit connects the drum outlet to the inlet of a roller mill where the heated grain is squeezed into flakes, which are then conveyed to a flake cooler which has an inlet and an outlet. Conduit means connect the flake cooler outlet to the inlet of a hammermill so the cooled flakes pass into the hammermill where they are ground into flour.

Preferably, the drum is perforated, and the hot gas is formed by the combustion of natural gas or other equivalent fuel. The gas passes through the drum transverse to the axis of rotation. Means are also provided for adding water at longitudinally spaced locations to wet the surface of the grain passing through the drum.

The flakes are preferably conveyed through ducts by airflow, and are separated from the flowing air by a cyclone separator before entering the flake cooler.

In the presently preferred embodiment of the invention, the ground flakes from the hammermill are fed to a sieve which permits flour to pass through to a bagging station. The ground flakes which will not pass through the sieve are returned to the hammermill for further processing.

These and other aspects of the invention will be more fully understood from the following detailed description and the accompanying drawing in which:

FIG. 1 is a schematic flow sheet showing the process and equipment of this invention; and FIG. 2 is a view taken on line 2—2 of FIG. 1.

Referring to the drawing, whole kernels of shelled corn (not shown) having a moisture content between about 12% and about 18% by weight are stored in an upright cylindrical corrugated steel bin 10 which has a hopper bottom 12. A screw conveyor 14 carries whole kernels of shelled corn from the bottom of the storage bin into the upper and inlet end 15 of a first roaster 16, which includes an elongated cylindrical shell 18 of perforated sheet metal mounted to rotate about a longitudinal axis inclined slightly to the horizontal. The first roaster has a first annular track 20 around its upper or inlet end, and a second annular track 22 around the outer periphery of the lower or outlet end 24. The first roaster rests on rollers 26 which fit in the tracks and are mounted to be driven by conventional means (not shown) to rotate about an axis parallel to the longitudinal axis of the roaster, thereby causing the roaster to turn.

As shown best in FIG. 2, longitudinally and radially extending lifter bars 28 are secured to the interior of the first roaster shell so that the whole kernels of shelled corn are tumbled as the roaster shell rotates about its longitudinal axis. A series of burners 30 are disposed under a narrow longitudinally extending firewall 32 disposed under the first roaster. The burners are supplied natural gas, or other suitable fuel, through a pipe 34 connected to a fuel supply 36. Flames from the burners are spread by the firewall so that they and the hot combustion gases pass up through the perforations in the first roaster shell to heat the corn being tumbled in it.

As shown best in FIG. 1, the burners are not disposed under a portion of the inlet end of the first roaster, but are disposed under the roaster for the rest of its length. This permits the incoming shelled corn kernels to be tumbled (before heating) with water supplied through a first waterline 40 connected through a control valve 42 to a filter 44, which is connected to a water source 46. Water is added continuously as shelled corn kernels are fed into the inlet end of the first roaster. The amount of water added can vary with the type of corn, but ordinarily between about 0.5 lbs. and about 2 lbs. of water are added for each 100 lbs. of shelled corn. The water and corn are tumbled in the roaster for 30 to 50 seconds before reaching the first burner. This insures that the corn kernels are coated with a film of water before being subject to substantial heating from the burning gas. The water added to the corn does not penetrate to the interior of the kernals, but remains on the surface to prevent local overheating and insure more uniform processing of the corn as it passes through the roaster. The water also humidifies the gas in the roaster, thereby minimizing moisture loss from the corn.

By the time the corn kernels reach the outlet end of the first roaster, their surfaces are substantially dry, and the interior of the corn has been heated by about one-half the amount required to make the interior of the kernels soft and malleable.

Corn kernels tumble out of the outlet end of the first roaster into a hopper 50 which directs them into the inlet end 52 of a second roaster 54, which is substantially identical with the first roaster, except that gas fired burners 56 are disposed under the entire length of the second roaster. Additional water is added to the corn kernels at the inlet end of the second roaster through a second waterline 58, which is connected through a control valve 60 to the filter 44. The amount of water added to the corn through the second waterline is substantially equal to that added at the inlet end of the first roaster. It is sufficient to wet the surface of the corn as it tumbles past, but does not significantly increase the internal moisture of the shelled corn kernels. It does increase the humidity of the hot gas, thereby minimizing moisture loss from the corn kernels as they are heated. The corn leaves the outlet end 62 of the second roaster through a downwardly inclined and enclosed grain conduit 70 which discharges heated corn kernels at its lower end into a conventional roller mill 72, which has a pair of opposed rollers 74 that squeeze the warm corn kernels into flat flakes about 1 inch in diameter and between about 0.006 and about 0.030 inches thick. The roller mill can be of the type shown in U.S. Pat. No. 3,404,986. The outside diameter of each of the rolls is 18 inches, and they are each 24 inches long. They turn at a rate to produce an equivalent linear speed of 366 inches per second at the nip of the rollers, and are urged toward each other under a spring (not shown) load of about 50,000 lbs., when the rollers are spread away from each other by a distance of approximately one-quarter inch. The surface temperature of the rollers is kept between about 180° and about 300° F. by hot air drawn past them from the grain conduit. Preferably, the rolls are serrated or grooved in a helical pattern so that the helical angle is between about 20° and about 30° with respect to the axis of rotation of each roll. The helical angle is in the same direction on each roll so that a waffle pattern is produced on the flakes as they pass through. The grooves on the rolls have a depth of about 0.015 inch and a width of about 0.04 inch. The spacing between the grooves is about 0.1 inch on centers.

To facilitate flow of the heated corn kernels down the grain conduit, an air compressor 75 supplies compressed air to a pressure regulator 76 and a control valve 77 to a nozzle 78 mounted in the upper end of the grain conduit to direct a jet of air downwardly toward the roller mill.

Although subject to seasonal and crop variations, the whole kernels of shelled corn are delivered to the inlet of the first roaster with a moisture content between about 14% and about 18% by weight. During the heating of the kernels, the moisture content is not reduced below about 8%, and preferably is maintained between about 12% and about 16%. An inadequate amount of moisture prevents proper internal conditioning of the corn kernels so that the final flour product would contain an unacceptable amount of hard flinty particulate matter. An excessive amount of moisture results in over-processing of the corn kernels, resulting in a flour which reconstitutes into a dough that is unacceptable for most cooking operations. The length of time the kernels are heated also depends somewhat on their condition on arrival from the field. Ordinarily, a total heating time, including both roasters and the grain conduit, of between about 1 minute and about 10 minutes providing at least the minimum amount of heat required for proper processing without over-processing. Thus, the kernels entering the roller mill are heated to a temperature above about 170° F. and just below that which would cause them to pop, while maintaining approximately all of the natural amount of moisture present in the kernels after conventional drying operations following shelling.

The flakes are carried by a current of air through a flake conduit 80 into a first cyclone separator 82 having an air discharge line 83 at its upper end connected to the inlet of a first blower 84 having an outlet connected by a duct 86 to a first dust bag 88, which collects undersize particles of corn flour. The first blower pulls hot air from the grain conduit to keept the rollers in the roller mill at the required operating temperature, and also supplies the air flow needed to convey the flakes into the first cyclone separator.

A conventional rotary valve 90 at the lower end of the first cyclone separator is intermittently turned by conventional means (not shown) to dump the flakes into the upper end of a conventional flake cooler, which may be of the type shown in U.S. Pat. No. 3,710,453. As the flakes work their way down the flake cooler, they are cooled as ambient air pulled through the cooler by a second blower 94 having its inlet connected to a plenum chamber 96 on the downstream side of the flake cooler. The discharge of the second blower is connected by a duct 98 to a second dust bag 100 to collect any undersized particles which may be carried from the flake cooler by the airstream.

Cooled flakes (not shown) are dumped into a conventional hammermill 102 at the lower or discharge end of the flake cooler. The flakes are comminuted to flour-sized particles and discharged from the hammermill through a duct 104 connected to the inlet side of the third blower 106, which delivers the flour through a duct 108 to the inlet of a second cyclone separator 110. To avoid over-processing from heat added to the flakes during comminution in the hammermill, the flakes are preferably cooled to below 100° F. before entering the hammermill. Air leaves the upper end of the second cyclone separator through a duct 112, which is connected to the inlet side of a fourth blower 114, having its discharge connected through a duct 116 to a third dust-bag 118, which collects undersized corn flour particles.

A rotary valve 120 on the lower end of the second cyclone separator is rotated intermittently by conventional means (not shown) to dump the flour onto a screen 122 of a conventional sieve 124. Flour particles passing through the screen of the sieve are delivered through a conduit 126 to a conventional bagging unit 128 where the corn flour is packaged for storage and delivery.

The cornmeal or corn flour which does not pass through the screen of the sieve is returned through a return line 130 to the hammermill for further grinding. The hammermill is operated so that most of the flour leaving passes through the sieve screen, which can be of any desired size, but typically in a U.S. No. 40 screen. The hammermill is also operated so that less than about 80% of the flour passes through U.S. No. 100 mesh screen.

Thus, with the apparatus and process just described, whole kernels of grain, such as corn, are processed so that the enzymes are inactivated before the grain structure is disrupted. This is accomplished by heating the grain before any grinding operation is performed on it. Moreover, the heating is done under conditions which soften the grain, but do not over-process it so that it will form a flour which can be used in most cooking operations.

In short, this invention provides a whole grain flour which is stable and has a long shelf life.

Although the preferred embodiment of the invention includes two roasters, adequate heat processing could be applied to the kernels of corn in a single roaster which is either longer, or turned at a slower rate to retain the kernels for the required length of time. However, the use of two roasters in series as shown in the preferred embodiment has the advantage of facilitating the addition of cool water at longitudinally spaced locations during the travel of the kernels through the heating stage. This avoids over-wetting of the corn as it enters the first roaster, and yet provides the desired "quenching" action of the cooling water to prevent scorching of the kernels and to maintain the desired humidity of the hot gas in the roaster. This makes a process very tolerant of corn delivered from the field under varying conditions, such as, temperature, moisture content, crop variety, etc.

I claim:

1. Apparatus for making flour from whole corn kernels, the apparatus comprising:

an elongated cylindrical drum having an inlet at one end and an outlet at the other end; means supporting the drum with the longitudinal axis tilted from the horizontal, with the inlet end higher than the outlet end;

means for introducing whole kernels of corn into the drum through the inlet;

means for flowing hot gases through the drum in direct contact with the kernels;

means for rotating the drum about its longitudinal axis to cause the kernels in it to be tumbled through the hot gases and moved to the drum outlet;

a roller mill having an inlet and an outlet;

means connecting the drum outlet to the rioller mill inlet so that heated corn kernels are fed into the roller mill inlet, squeezed into flakes and discharged from the roller mill outlet while at an elevated temperature;

a flake cooler having an inlet and an outlet;

a flake conduit connecting the roller mill outlet to the flake cooler inlet;

a hammermill having an inlet and outlet; and means connecting the flake cooler outlet to the hammermill inlet so cooled flakes pass into the hammermill and are ground into flour.

2. Apparatus according to claim 1 in which the drum is perforated

3. Apparatus according to claim 2 which includes burners disposed beneath the drum for burning a fuel which causes hot gases to flow into the drum.

4. Apparatus according to claim 3 which includes an elongated firewall disposed between the burners and the drum to cause flame from the burners to spread before entering the drum.

5. Apparatus according to claim 3 in which the burners are disposed longitudinally along the bottom of the drum to cause hot gas to pass through the drum transverse to the axis of the drum rotation.

6. Apparatus according to claim 1 which includes means for wetting the outer surface of the kernels entering the drum inlet with a film of water.

7. Apparatus according to claim 6 in which the burners are spaced longitudinally from the inlet to the rotating drum to permit the corn to be tumbled and coated with the water before reaching the burners.

8. Apparatus according to claim 6 which includes means for adding water to the grain in the drum at locations longitudinally spaced along the axis of drum rotation.

9. Apparatus according to claim 1 which includes a cyclone separator disposed between the roller mill and the flake cooler.

10. Apparatus according to claim 1 which includes a sieve for flour produced by the hammermill, and means for feeding flour from the hammermill onto the sieve.

11. Apparatus of claim 10 further includes means directing the material not passing through the sieve back to the inlet to the hammermill.

12. Apparatus for making flour from whole corn kernels, the apparatus comprising:

an elongated cylindrical drum having an inlet at one end and an outlet at the other end; means supporting the drum with the longitudinal axis tilted from the horizontal, with the inlet end higher than the outlet end;

means for introducing whole kernels of corn into the drum through the inlet;

means for flowing hot gases through the drum in direct contact with the kernels;

means for rotating the drum about its longitudinal axis to cause the kernels in it to be tumbled through the hot gases and moved to the drum outlet;

a roller mill having an inlet and an outlet;

means connecting the drum outlet to the roller mill inlet so that heated corn kernels are fed into the roller mill inlet, squeezed into flakes and discharged from the roller mill outlet while at an elevated temperature;

a flake cooler having an inlet and an outlet;

a flake conduit connecting the roller mill outlet to the flake cooler inlet;

a hammermill having an inlet and an outlet;

means connecting the flake cooler outlet to the hammermill inlet so cooled flakes pass into the hammermill and are ground into flour, a sieve for flour produced by the hammermill, means for feeding flour from the hammermill onto the sieve, and means directing the material not passing through the sieve back to the inlet to the hammermill.

13. Apparatus according to claim 12 which includes a cyclone separator disposed between the hammermill and the sieve.

14. Apparatus according to claim 1 which includes means for wetting the outer surface of the kernels with a film of water at the inlet end of the drum.

* * * * *